United States Patent
Ma et al.

(10) Patent No.: US 6,613,422 B1
(45) Date of Patent: Sep. 2, 2003

(54) NITROGEN-IMPLANTED, HIGH CARBON DENSITY OVERCOATS FOR RECORDING MEDIA

(75) Inventors: Xiaoding Ma, Fremont, CA (US); Michael Joseph Stirniman, Fremont, CA (US); Jing Gui, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 51 days.

(21) Appl. No.: 09/994,780

(22) Filed: Nov. 28, 2001

Related U.S. Application Data

(60) Provisional application No. 60/312,694, filed on Aug. 15, 2001.

(51) Int. Cl.⁷ .................................................. G11B 5/72
(52) U.S. Cl. ........................ 428/212; 428/216; 428/218; 428/65.5; 428/336; 428/408; 428/694 TC
(58) Field of Search .............................. 428/212, 216, 428/218, 408, 694 TC, 336, 65.5

(56) References Cited

U.S. PATENT DOCUMENTS

| | | | |
|---|---|---|---|
| 5,540,957 A | 7/1996 | Ueda et al. | |
| 5,567,512 A | 10/1996 | Chen et al. | |
| 5,637,393 A | * 6/1997 | Ueda et al. | 428/332 |
| 5,679,431 A | 10/1997 | Chen et al. | |
| 5,763,087 A | * 6/1998 | Falabella | 428/408 |
| 5,776,602 A | * 7/1998 | Ueda et al. | 428/332 |
| 5,837,357 A | 11/1998 | Matsuo et al. | |
| 5,855,746 A | 1/1999 | Prabhakara et al. | |
| 5,858,182 A | 1/1999 | Horng et al. | |
| 5,945,191 A | 8/1999 | Hwang et al. | |
| 6,136,403 A | 10/2000 | Prabhakara et al. | |
| 6,238,780 B1 | 5/2001 | Wu et al. | |
| 6,245,417 B1 | 6/2001 | Huang | |
| 2001/0031382 A1 | 10/2001 | Kusakawa et al. | |

OTHER PUBLICATIONS

Veerasamy, Vijayen, Tetrahedral Amorphous Carbon, Apr. 1994, University of Cambridge UK,p. 173.*

* cited by examiner

*Primary Examiner*—Stevan A. Resan
(74) *Attorney, Agent, or Firm*—McDermott, Will & Emery

(57) ABSTRACT

A method of forming a layer of a novel hard, abrasion and corrosion resistant, nitrogen-doped, high carbon density, amorphous carbon or hydrogenated carbon (C:H) protective overcoat material on a surface of a recording medium comprises steps of:

(a) providing a substrate including a stacked plurality of thin film layers thereon constituting the medium;

(b) forming, by a process comprising generation and deposition of C ions having energies of at least about 90 eV, a layer of an amorphous carbon or hydrogenated carbon (C:H) material on the at least one surface of the substrate, the C:H layer having a high carbon density of at least about 2.0 gm/cm³; and (c) implanting nitrogen (N) ions in a surface portion of the high carbon density amorphous carbon or C:H layer to form an N-doped amorphous carbon or C:H surface layer having a carbon density substantially equal to said high C density of the C:H layer formed in step (b).

Embodiments of the invention include thin-film magnetic and magneto-optical recording media including a layer of the novel material as a protective overcoat.

9 Claims, 3 Drawing Sheets

○ NEUTRAL MOLECULES
⊖ ELECTRONS
● IONS

NITROGEN-IMPLANTED, HIGH CARBON DENSITY OVERCOATS FOR RECORDING MEDIA

CROSS-REFERENCE TO PROVISIONAL APPLICATION

This application claims priority from U.S. provisional patent application Serial No. 60/312,694 filed Aug. 15, 2001, the entire disclosure of which is incorporated herein by reference.

FIELD OF THE INVENTION

The present invention relates to a method for forming carbon-based protective overcoat layers having improved corrosion and wear resistance, and to improved magnetic and MO recording media including an ultra-thin, carbon-based protective overcoat layer formed according to the inventive methodology. The present invention is particularly useful in the manufacture of very high areal recording density magnetic media utilized with read/write transducers operating at very low flying heights.

BACKGROUND OF THE INVENTION

A magnetic recording medium, e.g., a hard disk, typically comprises a laminate of several layers, comprising a non-magnetic substrate, such as of Al—Mg alloy or a glass or glass-ceramic composite material, and formed sequentially on each side thereof, a polycrystalline underlayer, typically of chromium (Cr) or Cr-baed alloy, a polycrystalline magnetic recording medium layer, e.g., of a cobalt (Co)-based alloy, a hard, abrasion-resistant, protective overcoat layer, typically containing carbon (C), and a lubricant topcoat.

In operation of the magnetic recording medium, the polycrystalline magnetic recording medium layer is locally magnetized by a write transducer, or write head, to record and store information. The write transducer creates a highly concentrated magnetic field which alternates direction based on the bits of information being stored. When the local magnetic field produced by the write transducer is greater than the coercivity of the recording medium layer, then the grains of the polycrystalline recording medium at that location are magnetized. The grains retain their magnetization after the magnetic field produced by the write transducer is removed. The direction of the magnetization matches the direction of the applied magnetic field. The magnetization of the polycrystalline recording medium can subsequently produce an electrical response in a read transducer, allowing the stored information to be read.

Thin film magnetic recording media are conventionally employed in disk form for use with disk drives for storing large amounts of data in magnetizable form. Typically, one or more disks are rotated on a central axis in combination with data transducer heads. In operation, a typical contact start/stop (CSS) method commences when the head begins to slide against the surface of the disk as the disk begins to rotate. Upon reaching a predetermined high rotational speed, the head floats in air at a predetermined distance from the surface of the disk due to dynamic pressure effects caused by air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions, allowing data to be recorded on and retrieved from the disk at a desired position.

Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the static position, and during deceleration just prior to completely stopping. Each time the head and disk assembly is driven, the sliding surface of the head repeats the cyclic sequence consisting of stopping, sliding against the surface of the disk, floating in the air, sliding against the surface of the disk, and stopping.

As a consequence of the above-described cyclic CSS-type operation, the surface of the disk or medium surface wears off due to the sliding contact if it has insufficient abrasion resistance or lubrication quality, resulting in breakage or damage if the medium surface wears off to a great extent, whereby operation of the disk drive for performing reading and reproducing operations becomes impossible. The protective overcoat layer is formed on the surface of the polycrystalline magnetic recording medium layer so as to protect the latter from friction and like effects due to the above-described sliding action of the magnetic head. Abrasion-resistant, carbon (C)-containing protective coatings have been utilized for this purpose, and are typically formed by sputtering of a carbon target in an argon (Ar) atmosphere. Such amorphous carbon (a-C)-containing protective overcoat layers formed by sputtering have relatively strong graphitic-type bonding, and therefore exhibit a low coefficient of friction in atmospheres containing water ($H_2O$) vapor, which characteristic is peculiar to graphite. However, the a-C layers produced in such manner have very low hardness as compared with many ceramic materials such as are employed as slider materials of thin film heads, and thus are likely to suffer from wear due to contact therewith.

In recent years, therefore, carbon-based protective overcoat layers having diamond-like hardness properties (i.e., HV of about 1,000–5,000 $kg/mm^2$) have been developed, and films of diamond-like carbon (DLC) having a high percentage of diamond-type C-C bonding have been utilized. Such DLC films exhibit a high degree of hardness due to their diamond-like $sp^3$ bonding structure, and in addition, exhibit the excellent sliding properties characteristic of carbon, thus affording improved sliding resistance against sliders composed of high hardness materials. Such DLC films are generally obtained by DC or RF magnetron sputtering of a carbon target in a gas atmosphere comprising a mixture of Ar gas and a hydrocarbon gas, e.g., methane, or hydrogen gas. The thus-obtained films exhibit DLC properties when a fixed amount of hydrogen is incorporated therein. Incorporation of excessive amounts of hydrogen in the films leads to gradual softening, and thus the hydrogen content of the films must be carefully regulated.

Amorphous, hydrogenated carbon films (referred to herein as a-C:H films) obtained by sputtering of carbon targets in an Ar+$H_2$ gas mixture exhibiting diamond-like properties have also been developed for improving the tribological performance of disk drives; however, the electrical insulating properties of such type films lead to undesirable electrical charge build-up or accumulation during hard disk operation which can result in contamination, glide noise, etc. In order to solve this problem without sacrifice or diminution of the advantageous mechanical properties of such a-C:H films, attempts (for example, as disclosed in U.S. Pat. Nos. 5,540,957; 5,837,357; 5,855,746; and 5,858,182, as well as U.S. Patent Application Publication US 2001/0031382 A1 (published Oct. 18, 2001, the entire disclosures of which are incorporated herein by reference) have been made to form bi-layer structures including a lower C:H overcoat layer and an upper, nitrogen-containing C:H overcoat layer, or to dope or otherwise incorporate nitrogen (N) atoms into the surface of a C:H protective overcoat, in order to decrease the electrical resistivity thereof and/or to provide increased bonding of the lubricant topcoat layer to the protective overcoat layer.

However, the continuous increase in areal recording density of magnetic recording media requires read/write transducers operating at a commensurately lower flying height. Therefore, it would be advantageous to reduce the thickness of the carbon-based protective overcoat layer without adverse consequences. Conventional sputtered a-C:H materials are difficult to uniformly deposit and generally do not function satisfactorily at a thickness of about 30 Å or less. Specifically, conventional sputtered a-C:H films of about 30 Å thickness fail to provide adequate protection against corrosion of the underlying magnetic layer(s), particularly Co-containing ferromagnetic layers, when under environments of high temperature and humidity, and the resulting corrosion product(s) frequently are disadvantageously transferred to the transducer heads, often leading to failure of the disk drive.

The use of alternative deposition techniques for developing thinner, harder, and more dense C:H layers having the requisite mechanical and tribological properties has been studied, such as plasma enhanced chemical vapor deposition (PECVD), ion beam deposition (IBD), and filtered cathodic arc deposition (FCAD) techniques. For example, the IBD method can be utilized for forming high carbon density, hydrogenated carbon films (referred to herein as i-C:H films) that exhibit superior tribological performance at thicknesses below about 100 A. The superior tribological performance exhibited by C:H films (including i-C:H films) formed according to these alternative techniques are attributed to their greater hardness and density vis-à-vis conventional sputtered C:H films, stemming from the use of much higher carbon (C) ion energies (i.e., ~50–150 eV) during deposition by means of the alternative techniques. For example, as may be seen from the graph of FIG. 1, the present inventors have determined that the density of the C:H films increases substantially linearly with increasing C ion energy during deposition, and C:H films having desirable, very high C atom densities>~2.0 gm/cm$^3$ are formed when the C ion energy exceeds about 90 eV. However, such films may be insulating as deposited and, thus, suffer from the above-described drawback of electrical charge build-up during hard disk operation associated with sputtered a-C:H films.

In order to increase the electrical conductivity and to achieve better tribological performance of the C:H protective overcoat layers formed by the aforementioned alternative deposition techniques, the present inventors investigated a bi-layer approach similar to that utilized with sputtered C:H films, wherein a layer of nitrogen-doped C:H was deposited over an undoped C:H layer formed by the alternative technique (e.g., PECVD or IBD) for improving interaction between the protective overcoat and lubricant topcoat layers, the nitrogen content of the N-doped layer being controlled by regulating the flow of $N_2$ gas to the C:H deposition chamber. However, recent experiments by the present inventors have demonstrated that when the PECVD or IBD process is utilized for forming the nitrogen-doped layer, the nitrogen content of the resultant N-doped C:H films is very low, i.e., 5 at. % or less. Another drawback associated with this nitrogen doping methodology is that the carbon density of the N-doped C:H films is decreased relative to that of the undoped C:H films, as is evident from the graph of FIG. 2. The decreased carbon density of the N-doped C:H films disadvantageously results in degradation of the tribological performance of the overcoat layer.

Accordingly, there exists a need for an improved hard, abrasion and corrosion-resistant, high carbon density, nitrogen-doped material particularly suitable for use as ultra-thin (i.e., <30 Å thick) protective overcoat layers in high areal density magnetic recording media utilized with read/write transducers operating at extremely low flying heights, and a method for manufacturing same, which method is simple, cost-effective, and fully compatible with the productivity and throughput requirements of automated manufacturing technology.

The present invention fully addresses and solves the above-described problems attendant upon the formation of ultra-thin, abrasion and corrosion-resistant, high carbon density, N-doped protective overcoat layers suitable for use with high areal density magnetic recording media, such as are employed in hard drive applications, while maintaining full compatibility with all mechanical and electrical aspects of conventional disk drive technology. In addition, the present invention enjoys utility in the formation of ultra-thin, abrasion and corrosion-resistant protective overcoat layers required in the manufacture and use of thin film-based, ultra-high recording density magneto-optical (MO) data/information storage and retrieval media in disk form and utilizing conventional Winchester disk drive technology with laser/optical-based read/write transducers operating at flying heights on the order of a few micro-inches above the media surface.

DISCLOSURE OF THE INVENTION

An advantage of the present invention is an improved method of forming a layer of a hard, abrasion and corrosion resistant, nitrogen-doped, high carbon density, amorphous carbon or hydrogenated carbon (C:H) material on a surface of a substrate.

Another advantage of the present invention is an improved method of forming a protective overcoat layer on a magnetic or magneto-optical (MO) recording medium, comprising a hard, abrasion and corrosion resistant, nitrogen-doped, high carbon density, amorphous carbon or hydrogenated carbon (C:H) material.

Yet another advantage of the present invention is a magnetic or magneto-optical (MO) recording medium, comprising an improved protective overcoat layer including a novel hard, abrasion and corrosion resistant, nitrogen-doped, high carbon density, amorphous carbon or hydrogenated carbon (C:H) material.

Still another advantage of the present invention is a hard, abrasion and corrosion-resistant material useful in forming a protective overcoat layer for a magnetic or magneto-optical recording medium.

A further advantage of the present invention is a thin film layer stack including means less than about 30 Å thick for protecting the thin film layer stack against wear and corrosion while providing increased bonded lubricant ratio and decreased water contact angle.

Additional advantages and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to one aspect of the present invention, the foregoing and other advantages are obtained in part by a method of forming a layer of a hard, abrasion and corrosion resistant, nitrogen-doped, high carbon density, amorphous carbon or hydrogenated carbon (C:H) material on a surface of a substrate, which method comprises the steps of:

(a) providing a substrate having at least one surface for deposition thereon;

(b) forming, by means of a process comprising generation and deposition of carbon (C) ions having energies of at least about 90 eV, a layer of an amorphous carbon or hydrogenated carbon (C:H) material on the at least one surface of the substrate, the amorphous carbon or C:H layer having a high carbon (C) density of at least about 2.0 gm/cm$^3$; and (c) implanting nitrogen (N) ions in the surface of the high carbon density amorphous carbon or C:H layer to form an N-doped amorphous carbon or C:H surface layer having a high carbon density substantially equal to the high carbon density layer formed in step (b).

According to embodiments of the present invention, step (b) comprises forming the amorphous carbon or C:H layer having a high carbon density by means of a process selected from plasma-enhanced chemical vapor deposition (PECVD), ion beam deposition (IBD), and filtered cathodic arc deposition (FCAD).

In accordance with particular embodiments of the present invention, step (a) comprises providing a disk-shaped substrate including a stacked plurality of layers thereon forming a magnetic or magneto-optical (MO) recording medium; and step (b) comprises forming the amorphous carbon or C:H layer having a high carbon density on the exposed surface of an uppermost layer of the stacked plurality of layers.

According to certain embodiments of the present invention, step (b) further comprises forming the amorphous carbon or C:H layer having a high carbon density to a thickness not greater than about 30 Å; step (c) comprises bombarding the surface of the amorphous carbon or C:H layer having a high carbon density formed in step (b) with nitrogen (N) ions having sufficient incident energy to form the N-doped or amorphous carbon or C:H surface layer to a depth from about 3 to about 9 Å below the surface of the high carbon density C:H layer; e.g., step (c) comprises bombarding the surface of the amorphous carbon or C:H layer having a high carbon density with nitrogen ions having incident energy in the range from about 10 to about 120 eV, as e.g., wherein step (c) comprises exposing the surface of the amorphous carbon or C:H layer having a high carbon (C) density to a plasma containing nitrogen ions for an interval up to about 1.5 sec.

According to certain embodiments of the present invention, step (a) comprises providing a disk-shaped substrate including a stacked plurality of layers thereon forming a magnetic or magneto-optical (MO) recording medium; step (b) comprises forming the amorphous carbon or C:H layer having a high carbon density to a thickness not greater than about 30 Å on the exposed surface of an uppermost layer of the stacked plurality of layers, by means of a process selected from plasma-enhanced chemical vapor deposition (PECVD), ion beam deposition (IBD), and filtered cathodic arc deposition (FCAD); and step (c) comprises bombarding the surface of the amorphous carbon or C:H layer having a high carbon density with nitrogen (N) ions having sufficient incident energy to form the N-doped amorphous carbon or C:H surface layer to a depth from about 3 to about 9 Å below the surface of the amorphous carbon or C:H layer having a high carbon density, e.g., wherein: step (c) comprises exposing the surface of the amorphous carbon or C:H layer having a high carbon density to a plasma containing nitrogen ions having incident energy in the range from about 10 to about 120 eV for an interval up to about 1.5 sec.

Another aspect of the present invention is a recording medium, comprising:

(a) a substrate;

(b) a stack of thin film layers on the substrate; and (c) a protective overcoat layer on the surface of an uppermost layer of the stack of thin film layers, wherein:

the protective overcoat layer comprises a hard, abrasion and corrosion resistant, high carbon density, amorphous carbon or hydrogenated carbon (C:H) material including a first, undoped sub-layer ($c_1$) in contact with the surface of the uppermost layer of the stack of thin film layers and a second, nitrogen (N)-doped sub-layer ($c_2$) on the first, undoped sub-layer, said first and second sub-layers having substantially equal high carbon densities of at least about 2.0 gm/cm$^3$.

According to certain embodiments of the present invention, the protective overcoat layer (c) has a combined thickness of the first and second sub-layers ($c_1+c_2$) not greater than about 30 Å; and the second, N-doped sub-layer ($c_2$) has a thickness from about 3 to about 9 Å.

In accordance with particular embodiments of the present invention, the stack of thin film layers (b) comprises a stack of layers for a magnetic or magneto-optical (MO) recording medium; the substrate (a) is disk-shaped; and the medium further comprises a lubricant topcoat layer (d) on the protective overcoat layer (c).

Yet another aspect of the present invention is a hard, abrasion and corrosion-resistant material useful in forming a protective overcoat layer for a magnetic or magneto-optical (MO) recording medium, which material comprises a region of nitrogen (N)-doped, amorphous carbon or hydrogenated carbon (C:H) having a high carbon density of at least about 2.0 gm/cm$^3$.

According to embodiments of the present invention, the material further comprises a region of undoped, amorphous carbon or hydrogenated carbon (C:H) having a high carbon density of at least about 2.0 gm/cm$^3$.

Particular embodiments of the present invention include a magnetic or magneto-optical (MO) recording medium comprising a stack of thin film layers and a protective overcoat layer formed of the hard, abrasion and corrosion-resistant material on an uppermost layer of the layer stack, e.g., wherein the protective overcoat layer has an overall thickness not greater than about 30 Å, the region of undoped, high carbon density, amorphous carbon or hydrogenated carbon (C:H) forms a first sub-layer in contact with the uppermost layer of the layer stack, and the region of N-doped, high carbon density, amorphous carbon or hydrogenated carbon (C:H) forms an about 3 to about 9 Å thick second sub-layer on the first sub-layer.

Still another aspect of the present invention is a recording medium comprising:

(a) a substrate including thereon a stacked plurality of thin film layers; and (b) means less than about 30 Å thick and having a high carbon atom density of at least about 2.0 gm/cm$^3$ for protecting the stacked plurality of thin film layers against wear and corrosion while providing increased bonded lubricant ratio and decreased water contact angle.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the pertinent features are not necessarily drawn to scale but rather are drawn as to best illustrate the pertinent features, wherein.

DESCRIPTION OF THE INVENTION

Figure 1:
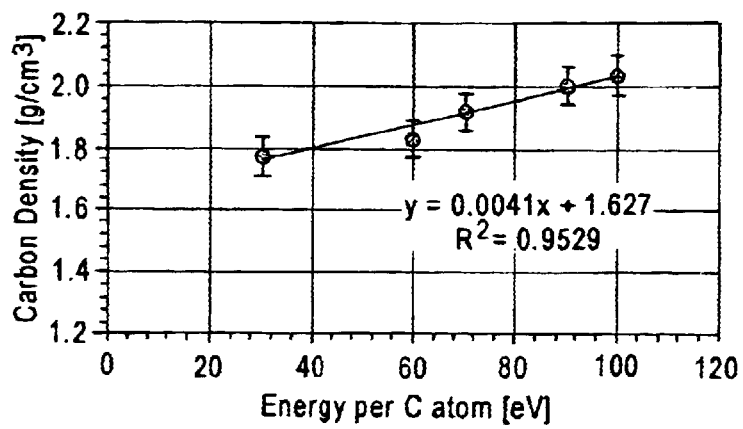
FIG. 1 is a graph for showing the dependence of carbon atom density of i-C:H films as a function of carbon ion energy during film formation.

The present invention addresses and solves problems attendant upon the formation of ultra-thin, abrasion and corrosion-resistant protective overcoat layers suitable for use with high areal density magnetic recording media, such as are employed in hard drive applications, while maintaining full compatibility with all mechanical and electrical aspects of conventional disk drive technology. In addition, the present invention enjoys utility in the formation of ultra-thin, abrasion and corrosion-resistant protective overcoat layers required in the manufacture and use of thin film-based, ultra-high recording density magneto-optical (MO) data/information storage and retrieval media in disk form and utilizing conventional Winchester disk drive technology with laser/optical-based read/write transducers operating at flying heights on the order of a few micro-inches above the media surface.

Specifically, the present invention is based, in part, upon recognition that novel hard, abrasion and corrosion-resistant, nitrogen (N)-doped, amorphous carbon or hydrogenated carbon (C:H) films and layers having high carbon atom densities at sufficiently high concentrations of nitrogen (N) dopant atoms/ions, suitable for use as ultra-thin, protective.overcoat layers of thin film magnetic and MO recording media, and exhibiting superior properties vis-à-vis similar but undoped, high carbon density amorphous. carbon or C:H films and layers obtained by conventional techniques, can be rapidly, conveniently, and cost-effectively formed by a process involving implantation of nitrogen (N) ions into high carbon atom density, undoped amorphous carbon or C:H layers or films, whereby N-doped amorphous carbon or C:H surface layers having a high carbon density substantially equal to the high carbon atom density, undoped layers or films and sufficient N doping are formed, which N-doped amorphous carbon or C:H surface layers impart advantageous tribological and corrosion resistance properties to the amorphous carbon or C:H layers.

According to a key feature indicative of the versatility of the inventive methodology, an undoped amorphous carbon or C:H material having a high carbon density of at least about 2.0 gm/cm$^3$ may be initially formed as an ultra-thin layer not greater than about 30 Å thick by means of any suitable high ion energy process comprising generation and deposition of carbon (C) ions having ion energies of at least about 90 eV, e.g., plasma-enhanced chemical vapor deposition (PECVD), ion beam deposition (IBD), and filtered cathodic arc deposition (FCAD); and according to another key feature of the present invention, the surface of the ultra-thin, undoped amorphous carbon or C:H layer having a high carbon atom density is bombarded for a very short interval (i.e., up to about 1.5 sec.) with nitrogen (N) ions formed by any suitable means/methodology and having sufficient incident energy to rapidly and cost-effectively form the advantageous N-doped amorphous carbon or C:H surface layer of high carbon atom density by implantation to a depth from about 3 to about 9 Å below the surface of the high carbon density, undoped amorphous carbon or C:H layer.

As indicated in FIG. 1, described supra, the present inventors have discovered that the higher the carbon atom/ion energy is during deposition, the denser, hence the harder and more abrasion and corrosion-resistant the deposited film is. Specifically, the present inventors have determined that C:H films with desirably high C atom densities of at least about 2.0 gms/cm$^3$ are formed when the process comprises generation and deposition of C ions having energies of at least about 90 eV. Moreover, inasmuch as the energies of particles generated in the conventional sputtering processes are limited, whether the particles are in atomic, molecular, clustered, or ionic form, it has been considered that conventional sputtered carbon protective overcoats may not possess the requisite high carbon atom densities for use in very high areal recording density media at overcoat thicknesses below about 30 Å. As a consequence, a number of techniques and methodologies involving deposition of more highly energetic particles have been studied and developed for use in forming amorphous carbon or C:H protective overcoat films and layers, including plasma-enhanced chemical vapor deposition (PECVD), ion beam deposition (IBD), and filtered cathodic arc deposition (FCAD).

Figure 2:
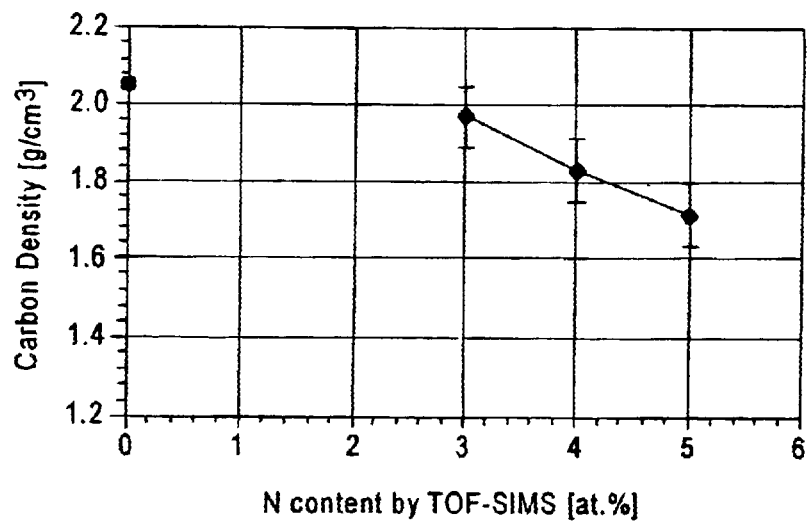
FIG. 2 is a graph for showing the dependence of carbon atom density of nitrogen (N)-doped i-C:H films as a function of nitrogen content of the (N)-doped i-C:H films formed when $N_2$ gas is flowed into the process chamber during the ion beam deposition (IBD) process.

In order to further improve the tribological performance of protective overcoats based upon high carbon density, undoped amorphous carbon or C:H films or layers formed by the above-mentioned energetic particle deposition processes, the present inventors have attempted to deposit a layer of high carbon density, nitrogen (N)-doped C:H material over the undoped films, as by addition of nitrogen ($N_2$) gas to the hydrocarbon gas utilized for the PECVD, IBD, or FCAD process for formation of the undoped C:H films or layers, wherein the nitrogen content of the N-doped C:H films or layers is controlled by appropriate adjustment of the $N_2$ gas flow into the deposition chamber containing the hydrocarbon gas. However, the present inventors have determined that: (1) the nitrogen content of N-doped C:H films produced by such energetic particle deposition processes (e.g., PECVD or IBD) is too low, i.e., $\leq 5$ at. %; and (2) the carbon atom density of the N-doped C:H films decreases with respect to the undoped C:H films, as shown in FIG. 2, which decrease in carbon atom density disadvantageously results in a diminution in the tribological performance of the N-doped C:H films.

Figure 3:
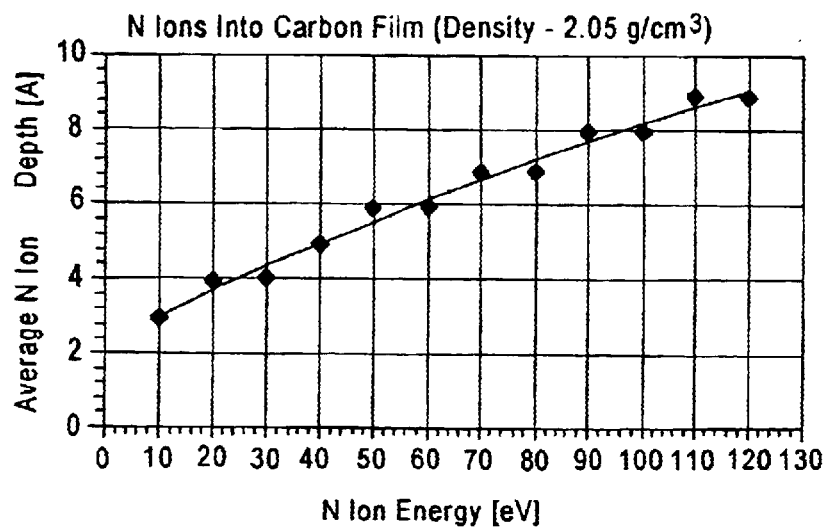
FIG. 3 is a graph for showing the dependence of the average penetration depth of nitrogen ions implanted into high carbon atom density i-C:H films as a function of the energy of the implanted nitrogen ions.

With this in mind, the inventors reasoned that a method for forming n-doped C:H films was required which would not entail disadvantageous reduction in carbon atom density, hence diminution of tribological and corrosion resistance properties of the resultant films. To this end, the inventors determined the penetration depth of implanted nitrogen (N) ions into high carbon atom density amorphous carbon or C:H films, e.g., IBD-C:H films (referred to herein as i-C:H films), as a function of the incident energy of the implanted N ions. Referring now to FIG. 3, it is seen that N ions with incident energies in the range from about 10 to about 120 eV can penetrate high carbon density (e.g., 2.05 gm/cm$^3$), undoped i-C:H layers to a depth from about 3 to about 9 Å below the surface of the former to form a high carbon density i-C:H protective overcoat layer having a surface layer comprised of an N-doped layer with a high carbon atom density substantially equal to that of the underlying undoped i-C:H material.

Figure 4:
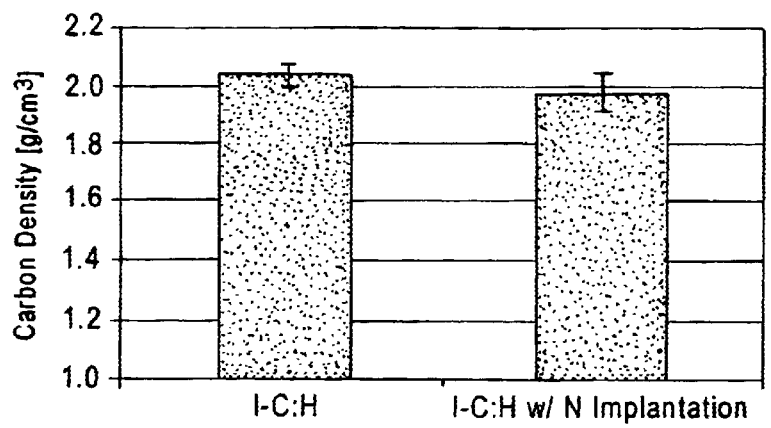
FIG. 4 shows bar graphs for illustrating and comparing the carbon atom densities of undoped i-C:H and N-doped i-C:H films formed by nitrogen ion implantation of undoped i-C:H films according to the present invention.

Stated differently, the inventors have determined that advantageous N doping of at least a surface portion of high carbon density, undoped amorphous carbon or undoped i-C:H layers may be readily accomplished with substantially no decrease in carbon atom density by a process involving implantation of N atoms into the high carbon density, undoped amorphous carbon or undoped i-C:H material. By way of illustration only, undoped i-C:H films of about 30 Å thickness and with a high C atom density of about 2.0 gms/cm$^3$ were prepared by means of IBD utilizing a working gas of acetylene ($C_2H_2$) and C ion energies of about 90 eV. After deposition of the undoped, high C density, i-C:H films was completed, nitrogen ($N_2$) gas was introduced into the process chamber at a flow rate between from about 5 to about 25 sccm and then ionized in conventional manner. The N ions were accelerated to energies up to about 90 eV for bombardment of the previously formed high carbon density, undoped i-C:H films for from about 0.3 to about 1.2 sec. As is apparent from the bar graphs of FIG. 4, wherein the concentration of N atoms in the implanted film was measured by ESCA, there is no significant decrease in carbon atom density of the N-doped i-C:H films vis-à-vis the carbon atom density of the undoped i-C:H films, when the former films are formed according to the inventive methodology involving implantation of N ions into at least a surface portion or strata of a high C atom density, undoped i-C:H layer.

Figure 5:
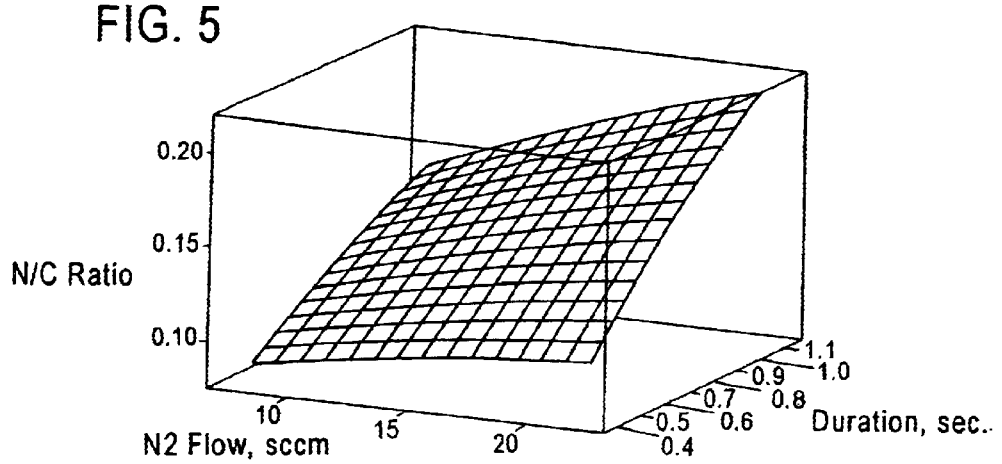
FIG. 5 is a 3-dimensional plot for showing the dependence of the ratio of nitrogen (N) to carbon (C) atoms in high carbon density, N-doped i-C:H films according to the invention, as a function of the $N_2$ flow rate and duration of nitrogen implantation.

Adverting to FIG. 5, shown therein is a 3-dimensional plot for showing the dependence of the ratio of nitrogen (N) to carbon (C) atoms in high carbon density, N-doped i-C:H films formed according to the present invention, as a function of the $N_2$ flow rate and duration of nitrogen implantation. As is evident from the figure, N/C ratios of the N-doped i-C:H films may vary from less than about 0.10 up to about 0.25 or greater by appropriate selection of the flow rate of the $N_2$ gas admitted to the process chamber (from about 5 to about 25 sccm) and the duration of ion implantation (from about 0.3 to about 1.2 sec.).

Figure 6:
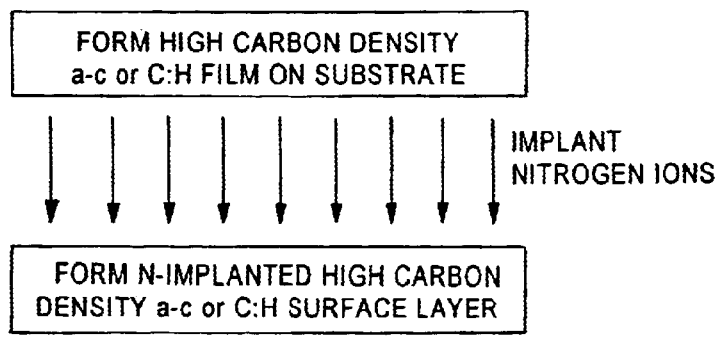
FIG. 6 is a simplified flow chart for illustrating the essential steps of the present invention.

Referring now to FIG. 6, shown therein, by way of illustration only, is a simplified flow chart for illustrating the essential steps of the present invention when utilized in forming a protective overcoat layer for a high areal density recording medium, e.g., a disk-shaped magnetic recording medium. Thus, in a first step according to the inventive methodology, a high carbon density (e.g., about 2.05 gm/cm$^3$), undoped amorphous carbon or undoped hydrogenated carbon (C:H) film or layer up to about 30 Å thick is formed on the surface of a substrate comprising a layer stack for e.g., a magnetic recording medium, as by a suitable energetic particle deposition method (e.g., PECVD, IBD, FCAD, etc.) comprising generation and deposition of C ions having energies of at least about 90 eV, and in a second step, subjected to N ion implantation (e.g., utilizing a $N_2$ flow rate of 5–25 sccm, 10–120 eV N ions, and a short implantation interval of e.g., 0.3–1.2 sec.) to form a high carbon density, N-doped amorphous carbon or hydrogenated carbon (C:H) sub-layer extending for a preselected depth (e.g., 3–9 Å) below the surface of the initially formed high carbon density layer, the carbon atom density of the N-doped and undoped materials being substantially equal (e.g., 2.05 gm/cm$^3$ for N/C atom ratios from less than about 0.10 up to about 0.25 or greater).

Figure 7:
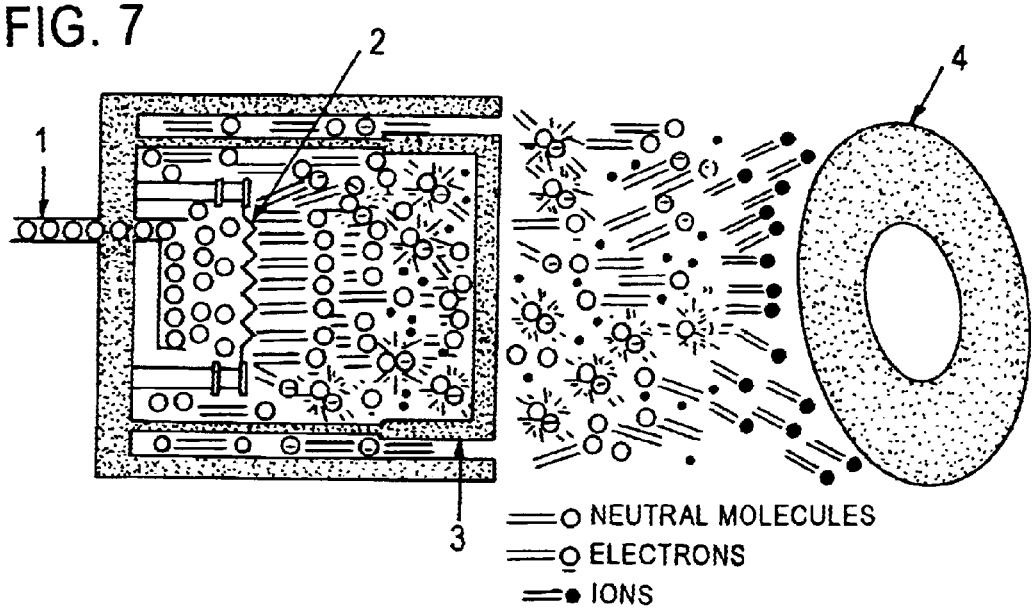
FIG. 7 is a simplified, partial cross-sectional schematic view of an ion source means suitable for practicing the present invention and for illustrating the mechanism of operation thereof.

FIG. 7 shows a simplified, partial cross-sectional schematic view of an ion source means (NCT Mark V, Intevac Co., Santa Clara, Calif.) suitable for practicing the present invention, i.e., for depositing DLC carbon films on suitable substrates. The mechanism of operation of the illustrated ion source means is as follows:

neutral molecules of the working gas, typically a hydrocarbon gas such as acetylene ($C_2H_2$) or ethylene ($C_2H_4$) are supplied to the interior of the source 1 from behind an anode 3 thereof;

electrons are emitted from the hot filament 2 within the source 1 with sufficient energy to ionize the neutral working gas molecules;

collisions occur between the electrons and neutral gas molecules to produce ionized gas molecule/electron pairs;

a plasma forms at a potential approximately equal to the anode voltage;

plasma ions of the working gas that leave the source 1 eventually strike either the source shields or the substrate 4, illustratively an annular disk-shaped substrate such as utilized in the manufacture of hard disk recording media; and the energy of ions bombarding the surface of substrate 4 is approximately equal to the potential difference between the anode 3 and the substrate 4. When the energy of the hydrocarbon ions of the plasma is in the range of about 180–200 eV, a film or layer of diamond-like (DLC) carbon is formed on the surface of the substrate.

Thus, according to.the present invention, the working gas initially supplied to ion source 1 is a hydrocarbon gas for formation of carbon ions with C ion energies of at least about 90 eV to form a high carbon density (i.e., about 2.0 gm/cm$^3$), undoped i-C:H film or layer on the surface of substrate 4. Upon completion of deposition of a desired thickness of the high carbon density, undoped i-C:H film or layer (e.g., up to about 30 Å), the supply of hydrocarbon working gas to source 1 is terminated, replaced with a supply of nitrogen ($N_2$) working gas at an appropriate flow rate, and the potential difference between the anode 3 and the substrate 4 adjusted for generation of an appropriate flux of nitrogen ions of desired energy (e.g., 10–120 eV) for bombarding the surface of the high carbon density, undoped i-C:H film or layer on substrate 4 for a desired interval (e.g., 0.3–1.2 sec.) to form a substantially similar high carbon atom density (i.e., about 2.05 gm/cm$^3$), N-doped i-C:H layer of desired N/C ratio (e.g., <0.10–>0.25) extending for a preselected depth (e.g., 3–9 Å) below the surface of the undoped i-C:H layer. Stated differently, the nitrogen content of the N-doped surface layer is readily controlled by adjusting the flow rate of the $N_2$ gas flow and implantation interval, as shown in FIG. 5 and the depth of the nitrogen implantation is similarly readily controlled by appropriate adjustment of the ion acceleration energy, as shown in FIG. 3.

Figure 8:
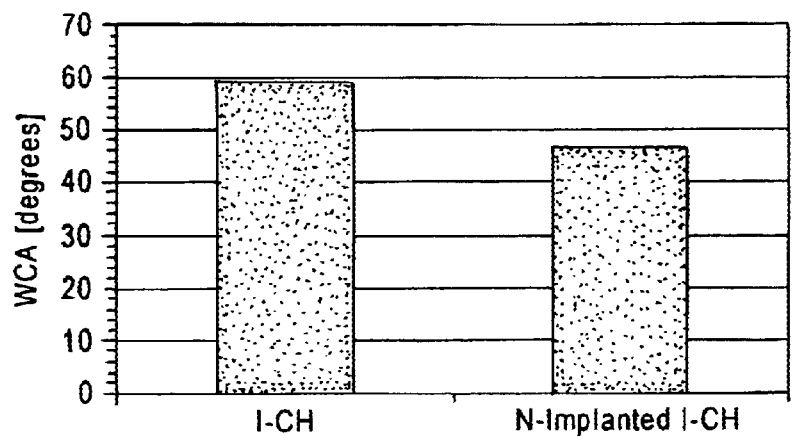
FIG. 8 is a bar graph for illustrating and comparing the water contact angles of undoped i-C:H and N-doped i-C:H films formed by nitrogen ion implantation of undoped i-C:H films according to the present invention.
Figure 9:
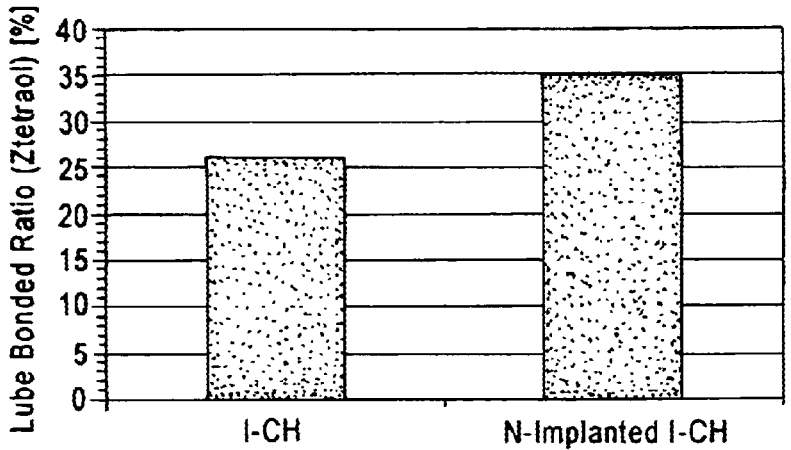
FIG. 9 is a bar graph for illustrating and comparing the bonded lubricant ratios of undoped i-C:H and N-doped i-C:H films formed by nitrogen ion implantation of undoped i-C:H films according to the present invention.

FIG. 8 is a bar graph for illustrating and comparing the water contact angles ("WCA") of high carbon atom density, undoped i-C:H films and high carbon atom density, N-doped i-C:H films formed by nitrogen ion implantation of high carbon atom density, undoped i-C:H films according to the present invention; and FIG. 9 is a bar graph for illustrating and comparing the bonded lubricant ratios of similar high carbon atom density, undoped i-C:H films and high carbon atom density, N-doped i-C:H films formed by nitrogen ion implantation of high carbon atom density, undoped i-C:H films according to the present invention. As expected, the WCA's advantageously decrease after implantation of nitrogen and the bonded lube ratios advantageously increase after nitrogen implantation. Both results indicate that the carbon surface energy increases after nitrogen implantation.

The inventive methodology differs from that disclosed in the aforementioned U.S. Patent Application Publication US 2001/0031382 A1 in several essential respects. Firstly, according to the present invention, the C ion energies during deposition of the undoped amorphous carbon or C:H are selected to be sufficiently high (i.e., >90 eV) as to produce films with very high carbon densities, i.e., >~2.0 gm/cm$^3$, which high C density films exhibit excellent tribological properties when utilized with flying head transducers at very small film thicknesses of ~30 Å or less. Secondly, according to the present invention, a sufficient amount of nitrogen (N) atoms is implanted into a thin surface stratum of the high C density films for improvement of the conductivity and bonded lubricant ratios without incurring the disadvantageous decrease in C atom density associated with the formation of N-doped C:H films via PECVD or IBD of hydrocarbon/$N_2$ gas mixtures. Thus, according to the inventive methodology the requirements of high C atom density and sufficient N dopant concentration of the N-doped surface stratum for obtaining thin carbon-based protective films with good tribological properties at very thin layer thicknesses, improved conductivities, and increased bonded lubricant ratios, are satisfied.

The present invention therefore provides a number of advantages over the conventional sputter-deposited amorphous carbon or C:H materials, films, and layers currently available for use as abrasion and corrosion-resistant protective overcoat layers for magnetic and MO recording media, such as hard disks. More specifically, the high carbon atom density, N-doped amorphous carbon or hydrogenated carbon (C:H) films according to the present invention provide enhanced tribological properties, reduced corrosion, and increased bonded lubricant ratios at ultra-thin thicknesses (i.e., ~30 Å), and thus are eminently suitable for use in the manufacture of very high areal recording density media and devices therefor requiring operation of read/write transducers at extremely low flying heights. In addition, the inventive means and methodology are fully compatible with all other aspects of automated manufacture of magnetic and MO media and are useful in a variety of other industrially significant applications, including, but not limited to, formation of hard, abrasion and corrosion resistant coatings useful in the manufacture of tools, bearings, turbines, etc.

In the previous description, numerous specific details are set forth; such as specific materials, structures, reactants, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in other combinations and environments and is susceptible of changes and/or modifications within the scope of the inventive concept as expressed herein.

What is claimed is:

1. A recording medium, comprising:
   (a) a substrate;
   (b) a stack of thin film layers on said substrate; and
   (c) a protective overcoat layer on the surface of an uppermost layer of said stack of thin film layers, wherein:
       said protective overcoat layer comprises a hard, abrasion and corrosion resistant, high carbon density, amorphous carbon or hydrogenated carbon (C:H) material including a first, undoped sub-layer ($c_1$) in contact with said surface of said uppermost layer of said stack of thin film layers and a second, nitrogen (N)-doped sub-layer ($c_2$) on said first, undoped sub-layer, said first and second sub-layers having substantially equal high carbon densities of at least about 2.0 gm/cm$^3$.

2. The medium as in claim 1, wherein:
   said protective overcoat layer (c) has a combined thickness of said first and second sub-layers ($c_1+c_2$) not greater than about 30 Å.

3. The medium as in claim 2, wherein:
   said second, N-doped sub-layer ($c_2$) has a thickness from about 3 to about 9 Å.

4. The medium as in claim 1, wherein:
   said stack of thin film layers (b) comprises a stack of layers for a magnetic or magneto-optical (MO) recording medium.

5. The medium as in claim 4, wherein:
   said substrate (a) is disk-shaped.

6. The medium as in claim 1, further comprising:
   (d) a lubricant topcoat layer on said protective overcoat layer (c).

7. A hard, abrasion and corrosion-resistant material adapted for forming a protective overcoat layer of a magnetic or magneto-optical (MO) recording medium, which material comprises a layer including a first region of nitrogen (N)-doped, amorphous carbon or hydrogenated carbon (C:H) having a high carbon density of at least about 2.0 gm/cm$^3$ and a second region of undoped, amorphous carbon or hydrogenated carbon (C:H) having a high carbon density of at least about 2.0 gm/cm$^3$, wherein said layer has an overall thickness not greater than about 30 Å, said first region of undoped, high carbon density, amorphous carbon or hydrogenated carbon (C:H) forms a first, lower sub-layer adapted for contact with an uppermost layer of a said recording medium, and said second region of N-doped, high carbon density, amorphous carbon or hydrogenated carbon (C:H) forms an about 3 to about 9 Å thick second, upper sub-layer on said first, lower sub-layer.

8. A magnetic or magneto-optical (MO) recording medium comprising a stack of thin film layers and a protective overcoat layer formed of the material according to claim 7 on an uppermost layer of said layer stack.

9. A recording medium comprising:

(a) a substrate including thereon a stacked plurality of thin film layers; and (b) means less than about 30 Å thick and having a high carbon atom density of at least about 2.0 gm/cm$^3$ for protecting said stacked plurality of thin film layers against wear and corrosion while providing increased bonded lubricant ratio and decreased water contact angle, said protecting means comprising a layer including a first region of nitrogen (N)-doped, amorphous carbon or hydrogenated carbon (C:H) having a high carbon density of at least about 2.0 gm/cm$^3$ and a second region of undoped, amorphous carbon or hydrogenated carbon (C:H) having a high carbon density of at least about 2.0 gm/cm$^3$, said first region of undoped, high carbon density, amorphous carbon or hydrogenated carbon (C:H) forming a first, lower sub-layer in contact with an uppermost layer of said recording medium, and said second region of N-doped, high carbon density, amorphous carbon or hydrogenated carbon (C:H) forming an about 3 to about 9 Å thick second, upper sub-layer on said first, lower sub-layer.

* * * * *